United States Patent [19]
Örnerfors et al.

[11] Patent Number: 5,769,024
[45] Date of Patent: Jun. 23, 1998

[54] METHOD OF MILKING ANIMALS

[75] Inventors: Benny Örnerfors, Järfälla; Ann-Louise Hörberg, Trångsund, both of Sweden

[73] Assignee: Alfa Laval Agri AB, Tumba, Sweden

[21] Appl. No.: 737,722

[22] PCT Filed: May 16, 1995

[86] PCT No.: PCT/SE95/00545

§ 371 Date: Nov. 13, 1996

§ 102(e) Date: Nov. 13, 1996

[87] PCT Pub. No.: WO95/31095

PCT Pub. Date: Nov. 23, 1995

[30] Foreign Application Priority Data

May 17, 1994 [SE] Sweden .................................. 9401684

[51] Int. Cl.$^6$ ...................................................... A01J 5/00
[52] U.S. Cl. .......................................................... 119/14.02
[58] Field of Search ............................. 119/14.02, 14.41, 119/14.47

[56] References Cited

U.S. PATENT DOCUMENTS

| | | |
|---|---|---|
| 4,011,838 | 3/1977 | Nordegren et al. . |
| 4,391,221 | 7/1983 | Hoefelmayr et al. . |
| 4,790,261 | 12/1988 | Wartenhorst . |
| 5,090,359 | 2/1992 | Petterson et al. . |
| 5,443,035 | 8/1995 | Lind et al. ............................ 119/14.02 |

FOREIGN PATENT DOCUMENTS

| | | |
|---|---|---|
| 0584890 | 3/1994 | European Pat. Off. . |
| 3609275 | 9/1987 | Germany . |

OTHER PUBLICATIONS

WO 9212625 A1 (Alfa Laval Agriculture International AB), 6 Aug. 1992 (WIPO).

*Primary Examiner*—Thomas Price
*Attorney, Agent, or Firm*—Hovey, Williams, Timmons & Collins

[57] ABSTRACT

In a milking process the animal is stimulated during a stimulation phase (I) for initiating the animal to let down milk in the udder, while a relatively small milk flow is achieved. During a subsequent main milking phase (II) the animal is treated to eject a relatively large milk flow. The stimulation phase is ended and the main milking phase is started when at least one monitored milking variable reaches a predetermined value. According to the invention the milking variable relates to the milk quantity extracted from the animal. Further milking variables may be monitored such as milk flow and the time of the stimulation phase, so that the stimulation phase is ended when any of the monitored milking variables reaches a predetermined value. Hereby the duration of the stimulation phase can be adapted to the individual needs of the animals.

20 Claims, 2 Drawing Sheets

METHOD OF MILKING ANIMALS

BACKGROUND OF THE INVENTION

1. Field of the Invention

The present invention relates to a method of milking an animal, in which the animal initially is stimulated during a stimulation phase of the milking to initiate the animal to let down milk in the udder, while a relatively small milk flow from the animal's teats is achieved. During a subsequent main milking phase of the milking the animal is treated such that a relatively large milk flow from the animal's teats is achieved. At least one milking variable is monitored during the stimulation phase, the latter being ended and the main milking phase being started when said milking variable reaches a predetermined value.

2. Description of the Prior Art

A cow to be milked will already at the preparation of her before the milking be stimulated by sound, sight and sensing impressions, which will cause the cow's muscles around the milk passages in the udder and the teats to relax, so that the milk passages are expanded. In consequence the quantity of milk, about 0,5–2 kg, which already exists in the cisterns of the udder can easily be mechanically milked. In cows which respond relatively strongly to stimulation the relatively light stimulation during the preparation of the cow before the milking has the consequence that the milk quantity which is enclosed in the milk forming alveoli in the udder is released and is given down into the udder cisterns. The stimulation activates the hormone oxytocine which affects the alveoli to contract so that the milk is pressed out.

However, cows which respond relatively weakly to stimulation have to be more intensively stimulated during the initial stimulation phase of the milking, in order to activate the oxytocine. It is known to achieve such an intensive stimulation by massaging the udder and teats with the aid of hands, brushes or liquid jets, or by influencing the teats with electrical impulses or pressure pulses of varying intensity and of high or low frequency.

Thus, some cows which are easy to stimulate may be fully prepared for milking already after a few seconds of stimulation, while other cows which are difficult to stimulate may need to be intensively stimulated at least one minute to get fully prepared for milking. In average, however, it takes less than a minute of intensive stimulation before the effect of oxytocine results. Thereafter the oxytocine normally is effective during a time of four to seven minutes. Therefore the milking should be finished during this time, because after that the cow does not cooperate actively.

To achieve a large milk flow from the cow's udder and thereby a rapid milking of the udder while the oxytocine is effective, a conventional milking machine exposes the cow's teat tips to a relatively strong milking vacuum, usually about 40–50 kPa. However, this strong milking vacuum gives rise to the problem that the teats are treated ungently initially during the milking, when the milk flow is small or nonexisting, which may result in discomfort and even pains to the cow. This may lead to that the hormone adrenaline is secreted and makes continued milk extraction difficult. Many modern milking machines avoid this problem by exposing the teat tips to a relatively weak, for the teats careful milking vacuum during the stimulation phase of the milking and switches to the stronger milking vacuum when the main milking phase begins.

It is known to monitor some milking variable during the stimulation phase and to finish the stimulation phase in response to said milking variable, when the latter reaches a predetermined value. Thus, U.S. Pat. No. 3,754,532 describes a milking machine which in response to the milk flow reaching a predetermined value switches between a careful milking vacuum acting during the stimulation phase and a strong milking vacuum acting during the main milking phase. In this case the pre-determined value of the milk flow is chosen relatively small: 0,2 kg/minute.

U.S. Pat. No. 4,391,221 describes a milking machine which in response to the lapse of a predetermined time period switches between a high frequency pulsation of the teats, acting during the stimulation phase, and a low frequency pulsation, acting during the main milking phase.

U.S. Pat. No. 4,011,838 describes a milking machine which is adapted to finish the stimulation phase in response to both the milk flow and the lapse of a predetermined time period. Thus, the stimulation phase is ended when the milk flow reaches a predetermined value provided that this occurs before the lapse of the predetermined time period. Also in this case the predetermined value of the milk flow is chosen relatively small; 0,2 kg/minute.

Also when milking a cow which is difficult to stimulate, a milk flow of 0,2 kg/minute may be achieved before the cow is completely stimulated, since there is already a certain available amount of milk in the udder cisterns. To make sure that the cows which are difficult to stimulate are satisfactorily stimulated before the stimulation phase is ended, the predetermined value for the milk flow could be increased from the usual 0,2 kg/minute to for instance at least 1 kg/minute.

However, in such a case the problem arises that the stimulation phase may be unnecessary long for certain cows which are easy to stimulate, so that the milking time for these is prolonged.

SUMMARY OF THE INVENTION

The object of the present invention is to achieve a method of milking animals by means of which the duration of the stimulation phase is better influenced by the individual stimulation needs of the animals, compared to known milking methods.

This object is obtained by a method of the kind initially described, which is characterized in that said milking variable relates to the milk quantity extracted from the animal. Hereby the advantage is obtained that the stimulation phase with certainty can be made relatively short for animals which are easy to stimulate and relatively long for animals which are difficult to stimulate, since extracted milk quantity constitutes a clear indication on how prepared the animal is for milking.

At least two milking variables are suitably monitored, the stimulation phase being ended when one of said two milking variables reaches a predetermined value. One of the milking variables of course relates to the milk quantity extracted from the animal while the other milking variable may relate to the milk flow from the animal's teats, or alternatively the duration of the stimulation phase. Hereby, the duration of the stimulation phase can be accurately adapted to the stimulation needs of the individual animal.

Preferably a plurality of milking variables are monitored, a first milking variable of which relates to the milk quantity extracted from the animal, a second milking variable of which relates to the milk flow from the animal's teats, and a third of which relates to the duration of the stimulation phase. The stimulation phase is finished when one of the milking variables reaches a predetermined value. Hereby the accuracy of the duration of the stimulation phase for the needs of the individual animals can be further increased. Besides monitoring the above mentioned first, second and third milking variables of course further milking variables may be monitored, for instance the fat content of the milk, the conductivity of the milk etc.

When milking cows, suitable predetermined values for the milking variables to be monitored are dependent on several different factors, such as breed, lactation status, milk yield, milking intervals, type of milking machine used, etc. The predetermined values for the milking variables must therefore be determined by means of experiments.

Nevertheless, in general when milking cows the predetermined value of the milk quantity is chosen in the range of 0,2–2,0 kg, preferably 0,4–1,0 kg, the predetermined value of the milk flow in the range of 0,5–2,5 kg/minute, and the predetermined value for the duration of the stimulation phase in the interval of 30–100 seconds.

During the stimulation phase the animal may advantageously be stimulated by exposing the animal's teats to pulses having a frequency of at least 2 Hz, preferably at least 3 Hz. This relatively high pulsation frequency, normal pulsation frequency during the main milking phase is usually 1 Hz, has the consequence that the teatcup liners in the teatcups of the milking machine have no time to open completely, whereby the teatcup liners maintain a good frictional engagement with the teats even if the milk flow is small. As a result of this it is avoided during the stimulation phase that the teatcups climb on the teats to positions which are more unfavourable for the extraction of milk. This is especially significant for the case when the teats are exposed to full milking vacuum during the stimulation phase as well as the main milking phase.

The invention is described more closely in the following with reference to the accompanying drawings.

DETAILED DESCRIPTION OF THE DRAWINGS

Figure 1:
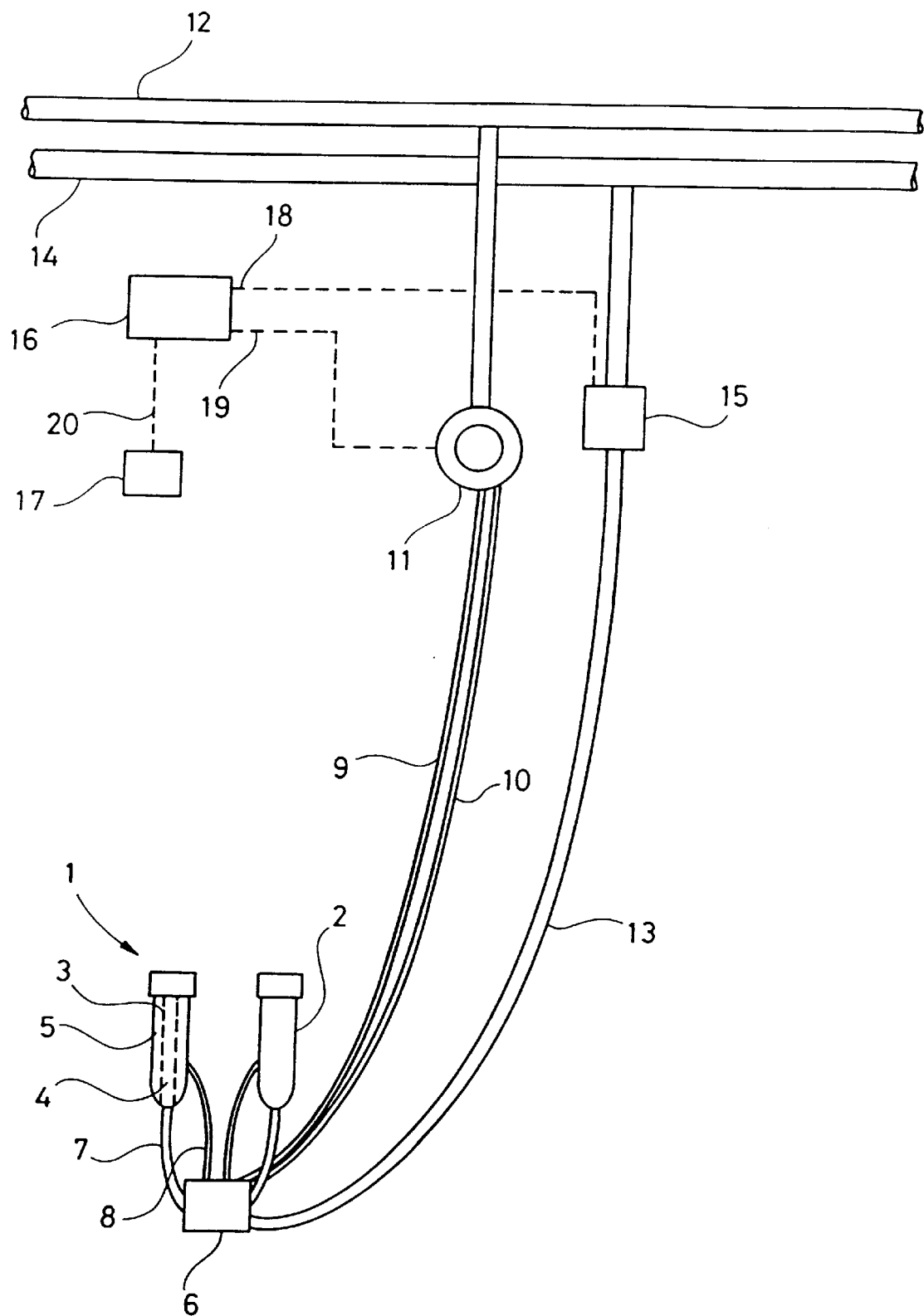
FIG. 1 is a schematic view showing a milking machine adapted to milk cows according to the method of the present invention.

In FIG. 1 there is shown a milking machine comprising a milking means 1, for instance of the type HARMONY™, with four teatcups 2, in which teatcup liners 3 are mounted (only two teatcups are shown). Each teatcup liner 3 has an interior milk conducting passage 4 and forms with the enclosing wall of the teatcup 2 a pulsation chamber 5. A teatcup claw 6 is connected to the teatcup liners 3 via four short milk hoses 7, and to the pulsation chambers 5 via four short pulsation hoses 8. Via the teatcup claw 6 the short pulsation hoses 8 are connected in pairs to two long pulsation hoses 9, 10, which extend upwardly from the teatcup claw 6 to a battery operated electronic pulsator 11. The pulsator 11 is connected to an air pipeline 12, the interior of which is exposed to an underpressure generated by a vacuum source (not shown).

The four short milk hoses 7 are via the teatcup claw 6 connected to a long milk hose 13, which extends upwardly from the teatcup claw 6 to a milk conduit 14, the interior of which communicates with said vacuum source. In the milk hose 13 there is a flow meter 15 for sensing the milk flow.

A control unit 16, is connected to the flow meter 15, the pulsator 11 and a timer 17 via respective signal conduits 18, 19 and 20. The control unit 16 is adapted to control the pulsation frequency of the pulsator 11 in response to input data from the timer 17 and the flow meter 15. The combination of the control unit 16 and the timer 17 may for instance be of the type ALPRO™.

The milking machine functions in the following way:

The teatcups 2 are applied on a cow to be milked. During an initial stimulation phase I of the milking the control unit 16 controls the pulsator 11 so that the latter alternates between atmospheric pressure and vacuum having a high frequency of 5 Hz. Thus, the teatcup liners 3 are vibrated at the same high frequency, which results in an intensive stimulation of the cow's teats, see FIG. 2 and 3. With the aid of the timer 17 and the flow meter 15 the control unit 16 monitors the milk quantity extracted from the cow, the actual milk flow through the milk hose 15 and the time which has lapsed since the stimulation phase I of the milking was started.

The control unit 16 ends the stimulation phase I by switching the pulsator 11 from 5 Hz to a normal frequency of 1 Hz, when any of the following three conditions are fulfilled:

The milk quantity amounts to 0,6 kg.

The milk flow amounts to 1,7 kg/min.

The stimulation phase I has lasted for 70 seconds.

Figure 2:
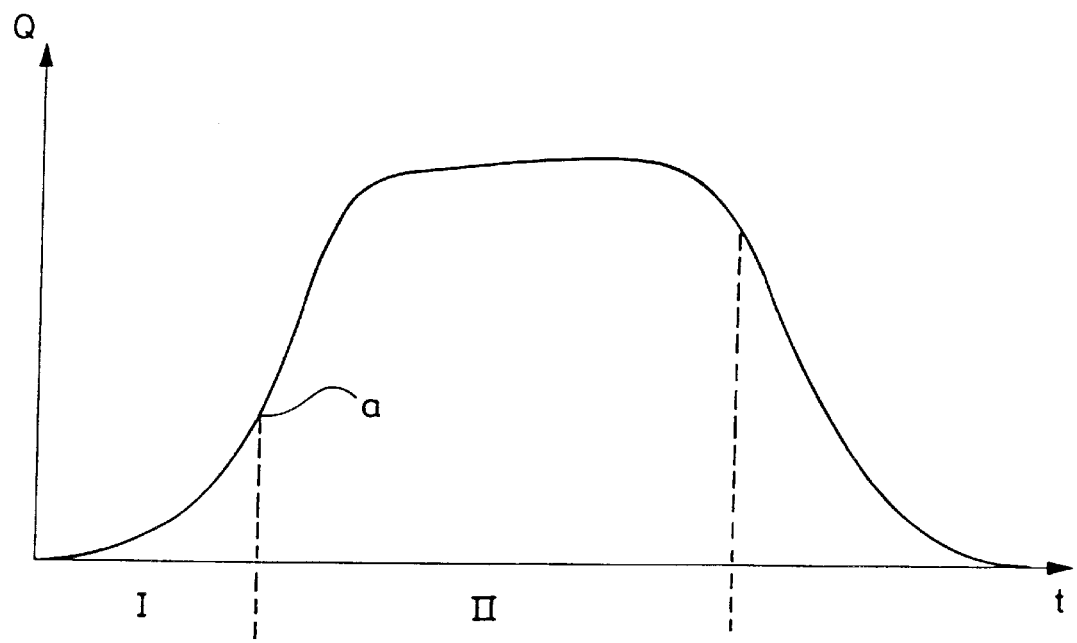
FIG. 2 is a diagram which shows, the variation of the milk flow Q during milking of a cow.
Figure 3:
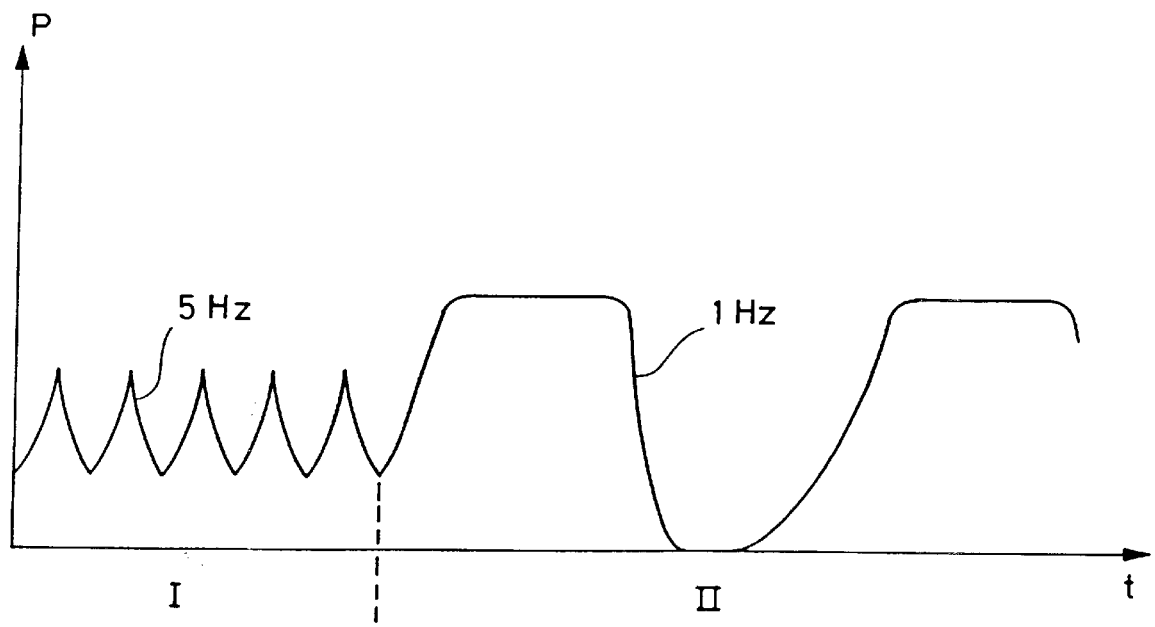
FIG. 3 is a diagram showing the pressure variations P in a teatcup of the milking machine according to FIG. 1, when a cow is milked.

In the diagram according to FIG. 2 there is shown a transition point of time a between the stimulation phase I and a main milking phase II of the milking, during which the pulsator 11 is operated at a normal frequency of 1 Hz. The transition point of time a thus is completely individual for the cow to be milked and may be varied with the milking occasions for the cow. The predetermined values for the milk quantity, the milk flow and the duration of the stimulation phase have been determined by means of experiments so that when milking a herd of cows the transition point of time is controlled by the milk quantity during the majority of the milkings, by the duration of the stimulation time during a small number of the milkings, and by the milk flow during the other milkings.

When test milking cows the above described milking machine has shortened the milking time by up to 10%, as compared with conventional milking machines which end the stimulation phase only in response to the milk flow amounting to 0,2 kg/minute. Alternatively, the milking vacuum has been able to be lowered, which has given an unchanged milking time, but a more careful teat treatment and a better milk yield as positive results.

The method according to the invention is well suited for automatic milking machines, which are adapted to automatically attach teatcups, milk and detach the teatcups.

We claim:

1. A method for milking an animal, comprising stimulating initially the animal during a stimulation phase for initiating the animal to let down milk in the udder, while achieving a relatively small milk flow from the animal's teats, treating the animal during a subsequent main milking phase to eject a relatively large milk flow from the animal's teats, monitoring at least one milking variable during the stimulation phase, ending the stimulation phase and starting the main milking phase when said milking variable reaches a predetermined value, said milking variable being the milk quantity extracted from the animal.

2. The method of claim 1, wherein when milking a cow the predetermined value of the milk quantity is chosen in the range of 0.2–2.0 kg.

3. The method of claim 2, wherein the predetermined value is chosen in the range of 0.4–0.8 kg.

4. The method of claim 1, further comprising exposing the animal's teats during the stimulation phase to pulses having a frequency which is at least 2 Hz.

5. The method of claim 4, wherein said frequency is at least 3 Hz.

6. A method for milking an animal, comprising stimulating initially the animal during a stimulation phase for initiating the animal to let down milk in the udder while achieving a relatively small milk, flow from the animal's teats, treating the animal during a subsequent main milking phase to eject a relatively large milk flow from the animal's teats, monitoring at least two milking variables during the stimulation phase, ending the stimulation phase and starting the main milking phase when any of said milking variables reaches a predetermined value, a first milking variable of said milking variables being the milk quantity extracted from the animal, and a second milking variable of said milking variables being the milk flow from the animal's teats.

7. The method of claim 6, wherein when milking a cow the predetermined value of the milk quantity is chosen in the range of 0.2–2.0 kg and the predetermined value of the milk flow is chosen in the range of 0.5–2.5 kg/minute.

8. The method of claim 7, wherein the predetermined value of the milk quantity is chosen in the range of 0.4–0.8 kg.

9. The method of claim 6, further comprising exposing the animal's teats during the stimulation phase to pulses having a frequency which is at least 2 Hz.

10. The method of claim 9, wherein said frequency is at least 3 Hz.

11. A method for milking an animal, comprising stimulating initially the animal during a stimulation phase for initiating the animal to let down milk in the udder, while achieving a relatively small milk flow from the animal's teats, treating the animal during a subsequent main milking phase to eject a relatively large milk flow from the animal's teat, monitoring at least two milking variables during the stimulation phase, ending the stimulation phase and starting the main milking phase when any of said milking variables reaches a predetermiend value, a first milking variable of said milking variables being the milk quantity extracted from the animal, and a second milking variable of said milking variables being the time elapsed from the beginning of the stimulation phase.

12. The method of claim 11, wherein when milking a cow the predetermined value of the milk quantity is chosen in the range of 0.2–2.0 kg and the predetermined value of the time elapsed from the beginning of the stimulation phase is chosen in the interval of 30–100 seconds.

13. The method of claim 12, wherein the predetermined value of the milk quantity is chosen in the range of 0.4–0.8 kg.

14. The method of claim 11, further comprising exposing the animal's teats during the stimulation phase to pulses having a frequency which is at least 2 Hz.

15. The method of claim 14, wherein said frequency is at least 3 Hz.

16. A method for milking an animal, comprising stimulating initially the animal during a stimulation phase for initiating the animal to let down milk in the udder, while achieving a relatively small flow from the animal's teats, treating the animal during a subsequent main milking phase to eject a relatively large milk flow from the animal's teats, monitoring a plurality of milking variables during the stimulation phase, ending the stimulation phase and starting the main milking phase when any of said milking variables reaches a predetermined value, a first milking variable of said milking variables being the milk quantity extracted from the animal, a second milking variable of said milking variables being the milk flow from the animal's teats, and a third milking variable of said milking variables being the time elapsed form the beginning of the stimulation phase.

17. The method of claim 16, wherein when milking a cow the predetermined value of the milk quantity is chosen in the range of 0.2–2.0 kg, the predetermined value of the milk flow is chosen in the range of 0.5–2.5 kg/minute and the predetermined value of the time elapsed from the beginning of the stimulation phase is chosen in the interval of 30–100 seconds.

18. The method of claim 17, wherein the predetermiend value of the milk quantity is chosen in the range of 0.4–0.8 kg.

19. The method of claim 16, further comprising exposing the animal's teats during the stimulation phase to pulses having a frequency which is at least 2 Hz.

20. The method of claim 19, wherein said frequency is at least 3 Hz.

* * * * *